United States Patent
Lu et al.

(10) Patent No.: US 10,395,126 B2
(45) Date of Patent: Aug. 27, 2019

(54) SIGN BASED LOCALIZATION

(71) Applicant: Honda Motor Co., Ltd., Tokyo (JP)

(72) Inventors: Yan Lu, College Station, TX (US); Aniket Murarka, San Jose, CA (US); Kikuo Fujimura, Palo Alto, CA (US); Ananth Ranganathan, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 365 days.

(21) Appl. No.: 14/822,951

(22) Filed: Aug. 11, 2015

(65) Prior Publication Data
US 2017/0046580 A1    Feb. 16, 2017

(51) Int. Cl.
| G06T 7/00 | (2017.01) |
| H04N 7/18 | (2006.01) |
| G06K 9/00 | (2006.01) |
| G06K 9/46 | (2006.01) |
| G06T 7/70 | (2017.01) |
| G06K 9/36 | (2006.01) |

(52) U.S. Cl.
CPC ....... *G06K 9/00818* (2013.01); *G06K 9/4671* (2013.01); *G06T 7/70* (2017.01); *H04N 7/181* (2013.01); *H04N 7/185* (2013.01); *G06K 2009/363* (2013.01)

(58) Field of Classification Search
CPC .. G06K 9/325; G06K 9/6211; G06K 9/00818; G06K 9/00798; G06F 17/30247; G06F 3/04842; G01C 21/26; G06T 7/00
USPC ......... 382/103, 203, 186; 345/441; 348/148; 715/810
See application file for complete search history.

(56) References Cited

U.S. PATENT DOCUMENTS

| 5,844,505 A | 12/1998 | Van Ryzin |
| 6,233,523 B1 | 5/2001 | Sood |
| 7,321,305 B2 | 1/2008 | Göllü |
| 8,121,350 B2 | 2/2012 | Klefenz |
| 8,131,118 B1 | 3/2012 | Jing et al. |
| 8,509,488 B1 | 8/2013 | Enge et al. |
| 8,768,012 B2 | 7/2014 | Satoh |
| 9,395,192 B1 * | 7/2016 | Silver ................. G01C 21/26 |

(Continued)

OTHER PUBLICATIONS

Gonzales, "A text reading algorithm for natural images", Jan. 22, 2013.*

(Continued)

*Primary Examiner* — Albert Kir
(74) *Attorney, Agent, or Firm* — Rankin, Hill & Clark LLP

(57) ABSTRACT

Systems and techniques for sign based localization are provided herein. Sign based localization may be achieved by capturing an image of an operating environment around a vehicle, extracting one or more text candidates from the image, detecting one or more line segments within the image, defining one or more quadrilateral candidates based on one or more of the text candidates, one or more of the line segments, and one or more intersections of respective line segments, determining one or more sign candidates for the image based on one or more of the quadrilateral candidates and one or more of the text candidates, matching one or more of the sign candidates against one or more reference images, and determining a location of the vehicle based on a match between one or more of the sign candidates and one or more of the reference images.

20 Claims, 8 Drawing Sheets

(56) References Cited

U.S. PATENT DOCUMENTS

| | | | |
|---|---|---|---|
| 9,632,691 B2* | 4/2017 | Masago | G06F 3/0488 |
| 2003/0202683 A1 | 10/2003 | Ma et al. | |
| 2009/0232358 A1* | 9/2009 | Cross | G06K 9/325 |
| | | | 382/103 |
| 2010/0092093 A1* | 4/2010 | Akatsuka | G06K 9/6211 |
| | | | 382/203 |
| 2010/0328316 A1* | 12/2010 | Stroila | G06K 9/00818 |
| | | | 345/441 |
| 2010/0328462 A1* | 12/2010 | Chen | G06F 17/30247 |
| | | | 348/148 |
| 2013/0157682 A1 | 6/2013 | Ling | |
| 2014/0143721 A1* | 5/2014 | Suzuki | G06F 3/04842 |
| | | | 715/810 |
| 2015/0269734 A1* | 9/2015 | Lee | G06K 9/00798 |
| | | | 382/103 |

OTHER PUBLICATIONS

Yao, "Locating text based on connected component and SVM", Nov. 2007 (Year: 2007).*
Epshtein, B., et al.: "Detecting Text in Natural Scenes with Stroke Width Transform" http://digital.cs.usu.edu/~vkulyukin/vkweb/teaching/cs7900/Paper1.pdf, printed Aug. 10, 2015, 8 pages.

\* cited by examiner

SIGN BASED LOCALIZATION

BACKGROUND

Typically, a global positioning system (GPS) is used to determine a location of a vehicle. For example, GPS may require a space based satellite navigation system that determines a location based on multiple GPS satellites. Often GPS is operational as long as there is an unobstructed view from the vehicle to respective GPS satellites. GPS units may suffer from drift as a result of accumulation or compounding of errors. Additionally, because GPS requires an unobstructed view to GPS satellites, inclement weather conditions, urban regions, mountainous terrain, or other occlusions often pose challenges to determining the location or position of a vehicle or in implementing vehicle localization.

BRIEF DESCRIPTION

According to one or more aspects, a system for sign based localization may include a sensor component mounted to a vehicle, an extraction component, a candidate component, a communication component, and a localization component. The sensor component may capture an image of an operating environment around the vehicle. The extraction component may extract one or more text candidates from the image, detect one or more line segments within the image, and define one or more quadrilateral candidates based on one or more of the text candidates, one or more of the line segments, and one or more intersections of respective line segments. The candidate component may determine one or more sign candidates for the image based on one or more of the quadrilateral candidates and one or more of the text candidates. The communication component may match or cross-reference one or more of the sign candidates against one or more reference images of a localization database. The localization component may determine a location of the vehicle based on a match between one or more of the sign candidates and one or more of the reference images.

In one or more embodiments, the extraction component may extract one or more of the text candidates based on a stroke width transform (SWT). The candidate component may filter one or more of the quadrilateral candidates based on a ground plane. The extraction component may extract one or more scale-invariant feature transform (SIFT) features from one or more of the sign candidates. The candidate component may filter one or more of the sign candidates based on a number of scale-invariant feature transform (SIFT) features associated with respective sign candidates. The extraction component may filter one or more of the line segments based on a line segment length criteria or a threshold proximity to text candidate distance. The candidate component may filter one or more line segments based on a vertical tolerance range or a horizontal tolerance range.

The extraction component may perform line segment linking based on two or more collinear line segments having endpoints which are less than a threshold proximity away from one another. The candidate component may filter one or more of the quadrilateral candidates based on a text candidate area to quadrilateral area threshold ratio. The candidate component may filter one or more of the sign candidates based on a number of maximum stable extreme regions (MSER) features associated with respective sign candidates. The communication component may match one or more of the sign candidates against one or more of the reference images based on putative scale-invariant feature transform (SIFT) matching. The communication component may remove one or more outliers from the matching based on homography based random sample consensus (RANSAC).

The localization component may determine the location of the vehicle using a perspective-n-point (PnP) solver module or a PnP unit or component. The system may include a navigation component generating one or more navigation instructions based on the location of the vehicle.

According to one or more aspects, a method for sign based localization may include capturing an image of an operating environment around a vehicle, extracting one or more text candidates from the image, detecting one or more line segments within the image, defining one or more quadrilateral candidates based on one or more of the text candidates, one or more of the line segments, and one or more intersections of respective line segments, determining one or more sign candidates for the image based on one or more of the quadrilateral candidates and one or more of the text candidates, matching one or more of the sign candidates against one or more reference images (e.g., associated with location data), and determining a location of the vehicle based on a match between one or more of the sign candidates and one or more of the reference images.

The method may include extracting one or more of the text candidates based on a stroke width transform. The method may include extracting one or more scale-invariant feature transform (SIFT) features from one or more of the sign candidates or filtering one or more of the sign candidates based on a number of SIFT features associated with respective sign candidates. The method may also include filtering one or more of the line segments based on a line segment length criteria or a threshold proximity to text candidate distance. The method may include filtering one or more of the sign candidates based on a number of maximum stable extreme regions (MSER) features associated with respective sign candidates. According to one or more aspects, a system for sign based localization may include a sensor component mounted to a vehicle, an extraction component, a candidate component, a communication component, and a localization component. The sensor component may capture an image of an operating environment around the vehicle. The extraction component may extract one or more text candidates from the image based on a stroke width transform (SWT), detect one or more line segments within the image, and define one or more quadrilateral candidates based on one or more of the text candidates, one or more of the line segments, and one or more intersections of respective line segments. The candidate component may determine one or more sign candidates for the image based on one or more of the quadrilateral candidates and one or more of the text candidates. The communication component may match or cross-reference one or more of the sign candidates against one or more reference images of a localization database based on putative scale-invariant feature transform (SIFT) matching. The localization component may determine a location of the vehicle based on a match between one or more of the sign candidates and one or more of the reference images.

DETAILED DESCRIPTION

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

The following terms are used throughout the disclosure, the definitions of which are provided herein to assist in understanding one or more aspects of the disclosure.

As used herein, a sign may include a sign board, a billboard, a road sign, other types of signs, etc. Examples of such signs may include signs on overpasses of highways, billboard signs, landmark signs, or signs which include text. Further, these terms may be used interchangeably throughout this disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Generally, sign boards, billboards, or road signs generally do not suffer from problems which may be associated with other types of localization, such as occlusion, shadows, detection, changes due to maintenance or repair, distance, drift, etc. In one or more embodiments, localization or determining a position or a location of a vehicle is provided based on text detection from sign boards. In other words, localization for a vehicle may be provided by detecting or determining the existence of sign boards on a highway via a camera, an image capture component, or sensor component 110 mounted on a vehicle. For example, a system 100 for sign based localization or vehicle localization may detect a sign board or a billboard, extract or recognize text from the sign board or billboard, filter false positive and false negative data from the extracted text or data (leaving sign candidates to be evaluated), and make a localization determination (e.g., using a perspective algorithm) based on the detected sign and/or extracted text by matching images or features of sign board or billboard candidates (e.g., sign candidates) to reference images or data in a localization database 190.

Figure 1:
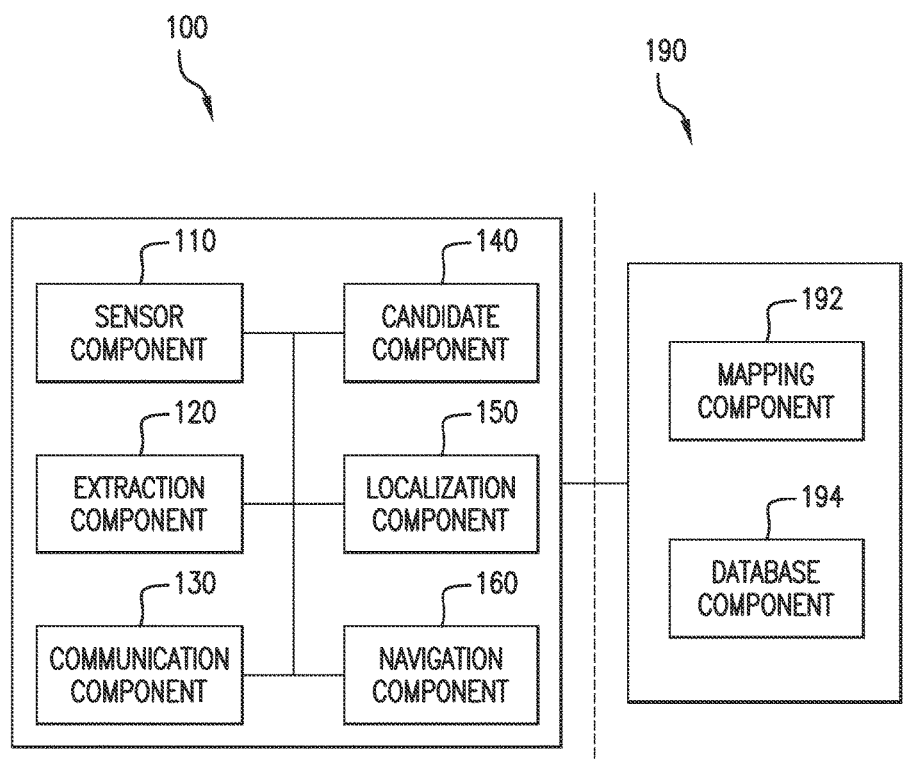
FIG. 1 is an illustration of an example system for sign based localization which may perform localization by referencing a localization database, according to one or more embodiments.

FIG. 1 is an illustration of an example system 100 for sign based localization which may perform localization by referencing a localization database 190, according to one or more embodiments. The system 100 for sign based localization may include a sensor component 110, an extraction component 120, a communication component 130, a candidate component 140, a localization component 150, and a navigation component 160. In one or more embodiments, a localization database 190 may include a mapping component 192 and a database component 194. The system 100 for sign based localization may cross-reference captured images against reference images of the localization database 190 or database component 194. In one or more embodiments, the localization database 190 or associated components, such as database component 194, may be remote from the system 100 for sign based localization. In other embodiments, the system 100 for sign based localization may include a database component (not shown within the system 100) similar to the database component 194 of the localization database 190.

Generally, the sensor component 110 detects, captures, or senses images to facilitate localization for a vehicle. The extraction component 120 may detect one or more signs, sign boards, billboards, road signs, etc. by extracting text from images, performing line segment detection (LSD), line segment linking, quadrilateral detection, quadrilateral filtering, quadrilateral boundary refining, maximum stable extreme regions (MSER) filtering, quadrilateral merging, etc. The candidate component 140 may determine one or more sign candidates based on quadrilaterals or quadrilateral candidates detected by the extraction component 120, thereby filtering out false positive or false negative sign candidates or other data.

A localization database 190 may include a mapping component 192 or a database component 194. The mapping component 192 may gather one or more reference images and analyze respective reference images for signs, sign boards, billboards, road signs, etc. Information associated with these signs, such as location information, position information, coordinate information, etc. may be extracted and stored to the database component 194. As an example, the database component 194 may store coordinates associated with one or more corners of one or more signs.

The communication component 130 may perform matching, cross-referencing, or data association between one or more sign candidates from a captured image against one or more reference images of a localization database 190, such as using putative scale-invariant feature transform (SIFT) matching, for example. The localization component 150 may determine a current location or current position of a vehicle based on a match, corresponding location information associated with a reference image, and a localization algorithm, such as a perspective-n-point (PnP) algorithm. The navigation component 160 may provide one or more navigation instructions accordingly.

The sensor component 110, may detect one or more images from a real world environment or an operating environment through which a vehicle is travelling. These images may include one or more signs, sign boards, billboards, road signs, other vehicles, roadways, road segments, obstacles, traffic, pedestrians, objects, hazards, etc. In one or more embodiments, the sensor component 110 may include a monocular camera, stereo cameras, or an image capture component. The sensor component 110, camera, or image capture component may be mounted on a vehicle to take pictures or capture images of signs, sign boards, billboards, or road signs along a roadway or road segment on which the vehicle is travelling. In other words, a function of the sensor component 110 may be to provide image capture capabilities for sign detection.

The sensor component 110 may implement one or more image capture techniques to compensate for different scenarios, such as a low lighting scenario or a low contrast scenario. For example, the sensor component 110 may tune one or more parameters associated with one or more of the images (e.g., captured by the sensor component 110), such as edge detection thresholds, which may be utilized by the extraction component 120. In other words, the sensor component 110 may adjust one or more edge detection thresholds such that additional or more edges are detected within an image. For example, if no or few signs are detected within an image or if a low lighting or low contrast scenario occurs, the sensor component 110 may adjust such parameters accordingly. As a result, more true positive edges may be detected, along with some false positive edges, which may be filtered by the candidate component 140 or by the extraction component 120, as will be discussed herein.

As previously discussed, the extraction component 120 may detect a sign, a sign board, a billboard, a road sign, or other types of signs. The extraction component 120, given an image from the sensor component 110, detects or determines whether a sign, sign board, or billboard exists within the image. Explained another way, the extraction component 120 may 'extract' or define one or more signs from one or more sign candidates (determined from one or more quadrilateral candidates) based on features found within an image. The extraction component 120 may utilize text extraction, line segment detection (LSD), line segment linking, quadrilateral detection, quadrilateral filtering, quadrilateral boundary refining, maximum stable extreme regions (MSER) filtering, quadrilateral merging, etc. as factors or cues to detect one or more sign candidates or potential sign boards.

In this regard, the extraction component 120 may extract text from an image, recognize text from image, or perform text determination to generate one or more text candidates from an image. For example, the extraction component 120 may detect text or texts from an image, such as an image captured by the sensor component 110. The candidate component 140 may identify one or more areas of interest or candidate areas within an image. These areas of interest or candidate areas may be analyzed further by components of the system 100 for sign based localization. In this way, the extraction component 120 may label a portion of an image as text or non-text. Here, the candidate component 140 may label one or more of the portions labelled as text as a text candidate.

In one or more embodiments, the extraction component 120 may detect one or more text candidates from an image based on a stroke width transform (SWT). In other embodiments, the extraction component 120 may detect one or more of the text candidates from an image based on optical character recognition (OCR). Thus, the extraction component 120 may achieve text recognition through a variety of techniques.

In one or more embodiments, the extraction component 120 may determine a ground plane, horizon plane, ground level, horizon level, etc. The candidate component 140 may further filter or remove information or candidates below horizon level. Effectively, the extraction component 120 may consider information above the ground or in the air (with reference to a perspective of a driver or occupant of a vehicle), according to one or more embodiments.

Figure 3A:
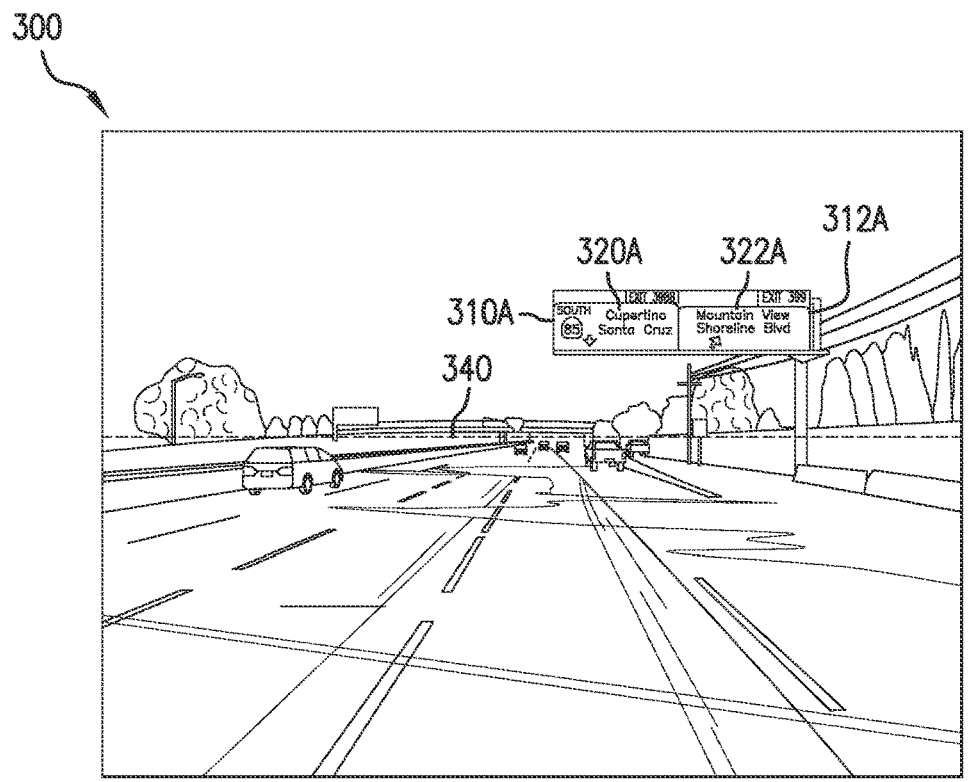
FIGS. 3A-B are illustrations of example text extraction from an image, according to one or more embodiments.

As an example, with reference to FIG. 3A, it can be seen that text 320A and 322A of signs 310A and 312A, respectively, may be identified through text extraction (e.g., performed by the extraction component 120). Here, in the example of FIG. 3A, because the candidate component 140 filters or removes information or candidates which are below horizon level 340, text associated with license plates of vehicles, for example, are not considered as text candidates, thereby enhancing text extraction. In other words, because a localization database 190 may include or have data associated with signs, such as signs 310A or 312A, it may be desirable to extract text 320A and 322A from an image. Accordingly, other text, such as text from vehicle license plates, speed limit signs, etc. may not be as useful as the text 320A and 322A of signs 310A and 312A. This may be because speed limit signs are generally not as 'unique' as other types of road signs, billboards, or signs, etc.

Further, the candidate component 140 may filter or remove one or more false positive or one or more false negative candidates from one or more of the text candidates. As an example, false negatives may be text candidates which are associated with a far distance from the vehicle or the sensor component 110 of the system 100 for sign based localization. In this way, the candidate component 140 may remove or filter candidates as false negative candidates because signs or images of objects far in the distance generally do not provide accurate information for localization. The candidate component 140 may filter candidates which do not have a threshold number of scale-invariant feature transform (SIFT) features, as billboards which are far away generally do not contribute accurate information with regard to localization.

The extraction component 120 may perform line segment detection (LSD), line segment linking, etc. to gather or analyze one or more line segments from an image captured by the sensor component 110. In one or more embodiments, the extraction component 120 may detect one or more line segments from an image and utilize respective detected line segments to identify sign boards, billboards, road signs, or other types of signs along a roadway or road segment. Additionally, the extraction component 120 may link or connect collinear line segments which are close in proximity to correct or compensate for erroneous readings, artifacts in an image, distortion, low light or low contrast scenarios, etc. Regardless, the extraction component 120 may detect or extract one or more line segments from an image.

The extraction component 120 may filter one or more line segments or select one or more line segments based on one or more line segment criteria. Line segment criteria may be used to distinguish lines of a billboard from lines of other objects. Thus, the extraction component 120 may apply line segment detection to an image to extract a set of one or more line segments. The extraction component 120 may then use one or more of the line segment criteria to select or determine a subset one or more line segments from the set of one or more line segments. In this way, line segments may be filtered or selected based on respective line segment criteria.

For example, the extraction component 120 may filter one or more line segments from a set of line segments based on proximity of a line segment to one or more text candidates. In other words, the extraction component 120 may filter line segments based on line segment criteria associated with a threshold proximity to text candidate distance. As an example, the extraction component 120 may filter or select a subset of one or more line segments based on line segment length criteria. Here, in this example, the extraction component 120 may filter line segments which are less than a threshold length (e.g., line segment length criteria). In this way, the extraction component 120 may select or generate a subset of one or more line segments which meet the line segment length criteria.

Other examples of line segment criteria may include k-d tree threshold proximities, line segment length, etc. For example, the candidate component 140 may filter or select a subset of one or more line segments based on line segment proximity to text criteria. Here, in this example, the extraction component 120 may store or define one or more pixel positions associated with text (e.g., from one or more of the text candidates) or one or more pixel positions associated with one or more of the line segments in a k-d tree. A k-d tree is a structure or data structure for organizing one or more positions in a k-dimensional space. Explained another way, a k-d tree is a tree where nodes of the tree represent k-dimensional points.

In one or more embodiments, the extraction component 120 determines a midpoint and endpoints for respective line segment of the one or more line segments. Thus, respective line segments may be associated with three points or pixel positions, including a first endpoint, a second endpoint, and a midpoint. According to one or more aspects, the candidate component 140 determines that a line segment proximity to text candidate criteria is met when two or more points of a line segment are within a threshold proximity to text candidate distance. In other words, the candidate component 140 may filter, generate, or select a subset of one or more line segments based on proximity of two or more points or pixel locations of a line segment to one or more text candidates or associated pixel locations.

Explained in greater detail, by way of an example, assuming that the threshold proximity to text candidate distance is 30 pixels; if we have a line segment with a first endpoint, a second endpoint, and a midpoint which are 20 pixels, 35 pixels, and 25 pixels away from a first text candidate, respectively, the candidate component 140 could select the line segment of this example to be included in the subset of line segments associated with line segment detection (LSD) or to be considered as a line segment candidate (e.g., because the first endpoint and the midpoint are less than the threshold proximity to text candidate distance). In this way, relevant line segments (e.g., a subset) may be selected from a set of one or more line segments of an image (e.g., line segment filtering).

In other embodiments, a different number of points may be considered for comparison against the threshold proximity to text candidate distance. Additionally, the threshold proximity to text candidate distance may be adjusted for different scenarios as well. Thus, the candidate component 140 may filter one or more line segments based on proximity to text candidates. In one or more embodiments, the candidate component 140 may perform one or more functions of the extraction component 120. In other embodiments, the extraction component 120 may perform one or more functions of the candidate component 140.

The extraction component 120 may perform quadrilateral detection or detect one or more quadrilaterals for the candidate component 140 to evaluate as a quadrilateral candidate. For example, the extraction component 120 may detect or 'define' one or more quadrilaterals formed by one or more of the line segments found or detected during line segment detection. Here, in this example, the extraction component 120 may detect quadrilaterals based on line segments of a subset of line segments based on line segment filtering. Because sign boards, billboards, and road signs generally have clear line segments as boundaries, the extraction component 120 may detect quadrilaterals which appear this way in an image and mark these quadrilaterals as regions of interest or as quadrilateral candidates for the candidate component 140.

In one or more embodiments, the candidate component 140 may filter or remove line segments which are not substantially vertical or substantially horizontal. For example, if a line segment is angled horizontally, or parallel with horizon level, this may be defined as zero degrees, while a line segment which is vertical may be defined as being at 90 degrees. The candidate component 140 may remove or filter line segment candidates which are outside of a tolerance range, such as a vertical tolerance range or horizontal tolerance range. In one or more embodiments, different tolerance ranges may be utilized by the candidate component 140 for vertical line segment filtering and horizontal line segment filtering.

For example, a vertical tolerance range may be 10 degrees. Here, in this example, the candidate component 140 may filter line segments which are not within the 80 degree-100 degree range. As another example, a horizontal tolerance range may be 20 degrees. Here, the candidate component 140 may filter line segments which are not within the −20 to 20 degree range. In this way, a horizontal tolerance range may be used which is greater than a vertical tolerance range. Therefore, according to one or more aspects, the candidate component 140 may be more selective for vertical line segments due to tighter vertical tolerance ranges, for example.

In this way, the candidate component 140 may provide the extraction component 120 with a subset of line segments which may be assembled and considered as quadrilateral candidates by filtering or selecting a subset of substantially vertical or substantially horizontal line segments which may be used to form or search for quadrilateral candidates.

The extraction component 120 may determine or calculate one or more intersections between one or more vertical line segments and one or more horizontal line segments. For example, the extraction component 120 may reference one or more pixel positions associated with points of the line segments from the k-d tree, such as a first endpoint, a second endpoint, or a midpoint of a line segment. The extraction component 120 may determine an intersection when an endpoint of a first line segment is within a threshold proximity of an endpoint of a second line segment. As an example, this threshold proximity may be 10 pixels. Thus, if a first line segment has an endpoint which is 5 pixels away from an endpoint of a second line segment, the extraction component 120 could determine that an intersection exists between the two line segments or than an intersection exists between the first line segment and the second line segment.

Further, the extraction component 120 may store the coordinates or positions associated with this intersection and information of corresponding line segments or communicate the same to the communication component 130.

In one or more embodiments, the extraction component 120 may determine one or more intersections based on a first line segment being a substantially vertical line segment and having two endpoints, a second line segment being a substantially horizontal line segment and having two endpoints, and an endpoint of the first line segment being less than a threshold proximity from an endpoint of the second line segment. In this way, the extraction component 120 may determine an intersection between a first line segment and a second line segment when respective line segments are substantially perpendicular (e.g., within a vertical tolerance range and/or a horizontal tolerance range) and endpoints of respective line segments are 'touching'.

In one or more embodiments, the extraction component 120 may implement line segment linking or 'line linking' to determine or form a longer line segment from two or more collinear, shorter line segments. For example, the sensor component 110 may capture an image where a line segment is broken into two or more line segments or line segments which are captured as having a false 'gap' in between. As a result of the false 'gap', quadrilateral detection implemented by the extraction component 120 may return quadrilaterals formed by short line segments. To compensate or mitigate such quadrilaterals associated with false 'gaps', the extraction component 120 may perform line segment linking, such as by linking closely located, collinear, or parallel line segments to form or recover longer line segments, thereby facilitating accurate line segment detection, quadrilateral detection, candidate selection, and billboard or sign detection.

In this regard, the extraction component 120 may link two or more line segments based on a first line segment having two endpoints and a first orientation, a second line segment having two endpoints and a substantially similar orientation (e.g., within a tolerance range of an orientation angle of the first line segment), and an endpoint of the first line segment being less than a threshold proximity from an endpoint of the second line segment, according to one or more aspects. In this way, the extraction component 120 may 'link' a first line segment and a second line segment when respective line segments are substantially collinear or parallel (e.g., within a tolerance range of one another) and endpoints of respective line segments are 'touching'. This may be done for vertical line segments, horizontal line segments, etc.

In one or more embodiments, the extraction component 120 may search for additional intersections (e.g., 'geo-corners') with one or more line segments (e.g., other than the first line segment and the second line segment). In other words, once an intersection between a first line segment and a second line segment is determined or detected by the extraction component 120, additional intersections tangential to the first line segment or the second line segment may be searched. Thus, given a first intersection associated with a first line segment and a second line segment, respective line segments may be considered as two sides of a quadrilateral. Here, the extraction component 120 may search for a third side of the quadrilateral by finding a third line segment which has an intersection with the first line segment or the second line segment. In this way, the extraction component 120 may perform quadrilateral searching or quadrilateral detection.

In one or more embodiments, the candidate component 140 may define a quadrilateral as a quadrilateral candidate based on a first line segment, a second line segment, and a third line segment, where the first line segment has an intersection with the second line segment and the second intersection has an intersection with the third line segment, and where the first line segment is substantially perpendicular to the second line segment and the second line segment is substantially perpendicular to the third line segment. Similarly, in this configuration, the first line segment may be substantially parallel to the third line segment.

In this way, the candidate component 140 may define quadrilateral candidates using three sides or three line segments which have two (or more) intersections. In one or more embodiments, the candidate component 140 may generate a bounding box around endpoints of respective line segments to define or approximate a quadrilateral candidate. In other embodiments, the extraction component 120 may search for a fourth side or a fourth line segment to complete a quadrilateral. However, merely three sides or three line segments may be used for quadrilateral candidate selection. In one or more embodiments, as a result of the candidate component 140 defining quadrilateral candidates using three sides or three line segments, candidate selection becomes more robust because missing fourth line segments, missing line segments, or missing boundary line segments (e.g., possibly not detected by the sensor component 110, etc.) are not required, thereby enabling 'inference' of quadrilateral candidates by the candidate component 140.

In one or more embodiments, the candidate component 140 may filter one or more quadrilateral candidates to remove or filter false positive candidates from one or more of the quadrilateral candidates. False positive quadrilateral candidates may include quadrilaterals having a bounding box which is larger than a corresponding billboard or sign. Here, the candidate component 140 may treat a quadrilateral candidate as a bounding box and examine whether a quadrilateral contains text. For example, if a quadrilateral candidate contains no text or zero text candidates, the candidate component 140 may remove that quadrilateral candidate from consideration or unmark that quadrilateral as a candidate. For example, this may be achieved using maximum stable extreme regions (MSER) filtering.

In one or more embodiments, the extraction component 120 may detect or extract a number of maximum stable extreme regions (MSER) features from one or more quadrilateral candidates and have the candidate component 140 filter respective candidates accordingly (e.g., based on a number of MSER features detected within respective quadrilaterals or quadrilateral candidates). For example, the candidate component 140 may filter or remove quadrilateral candidates from consideration which have less than a threshold number of MSER features. According to one or more aspects, the candidate component 140 may discard quadrilateral candidates which have fewer than or less than ten MSER features (e.g., in this example, the threshold number of MSER features would be ten). In this way, the candidate component 140 may effectively remove false positive quadrilateral candidates (e.g., remove quadrilaterals which do not contain enough text) without introducing false negative quadrilateral candidates. These MSER features may be passed to the communication component 130 to facilitate searching or matching.

Conversely, if a quadrilateral contains too much text or an area associated with a text candidate to quadrilateral area ratio greater than a threshold, the candidate component 140 may remove or discard the quadrilateral in a similar manner. An example of a text candidate area to quadrilateral area threshold ratio may be 0.8. Thus, if text covers greater than or over 80% of a quadrilateral, that quadrilateral may be discarded such that the quadrilateral is not a candidate. In one or more embodiments, the candidate component 140 may discard a quadrilateral candidate based on a text candidate area to quadrilateral area threshold ratio and the existence of another quadrilateral which encompasses a text candidate, thereby ensuring that that text candidate is not entirely discarded. In this way, the candidate component 140 may mitigate false positive text detection. In other words, the candidate component 140 may filter quadrilateral candidates based on an area or amount of text within a quadrilateral candidate. Thus, the candidate component 140 or the extraction component 120 may filter one or more quadrilaterals or perform quadrilateral filtering on one or more quadrilateral candidates.

The extraction component 120 may refine one or more boundaries of one or more of the quadrilateral candidates or one or more quadrilaterals. For example, the extraction component 120 may define one or more quadrilateral candidates using one or more bounding boxes associated with one or more line segments or associated endpoints. In one or more embodiments, the extraction component 120 may perform quadrilateral boundary refining on one or more quadrilateral candidates or associated line segments. For example, when a bounding box is placed around line segment endpoints to approximate or define a quadrilateral or quadrilateral candidate, this may result in bounding boxes which are oversized in comparison to the corresponding billboard or sign board because one or more line segments are associated with a longer length than the real length. Accordingly, the extraction component 120 may place a bounding box around intersections of line segments, for example. In other words, the extraction component 120 may extract one or more quadrilaterals by placing a bounding box around three or more line segments and two or more intersections. In any event, the extraction component 120 may iteratively check bounding boxes which define quadrilateral candidates for oversize features, such as mismatched line segment lengths, etc. and adjust bounding boxes accordingly.

The extraction component 120 may perform quadrilateral merging or filtering when quadrilateral candidates are nested, overlapping, partially overlapping, adjacent, almost adjacent within a proximity threshold, etc. Thus, quadrilaterals which are too close (e.g., within the proximity threshold) may be combined into a single (e.g., possibly larger) quadrilateral. When quadrilaterals are nested, the extraction component 120 may merge quadrilaterals or merely select the outside quadrilateral, while discarding the interior quadrilateral as a quadrilateral candidate.

As previously discussed, the candidate component 140 may determine one or more different candidates. For example, the candidate component 140 may facilitate determination of text candidates, line segment candidates, quadrilateral candidates, sign candidates, etc. The candidate component 140 may determine one or more sign candidates from one or more of the quadrilateral candidates which have a threshold number of text features (e.g., as determined by the maximum stable extreme regions feature extraction). In this way, the candidate component 140 may determine one or more sign candidates which are associated with one or more quadrilateral candidates and one or more text candidates contained within corresponding quadrilateral candidates. Further, the candidate component 140 may filter false positive and false negative sign candidates to provide or generate a set of one or more sign candidates.

A localization database 190 may include a mapping component 192 and a database component 194. The mapping component 192 may gather one or more reference images and analyze respective reference images for signs, sign boards, billboards, road signs, etc., thereby building a database of reference images to be searched. The mapping component 192 may extract information associated with these signs, such as location information, position information, coordinate information, etc., and store them on the database component 194. As an example, the database component 194 may store coordinates associated with one or more corners of one or more signs.

In one or more embodiments, the mapping component 192 may collect information associated with signs, sign boards, billboards, or road signs from a real world environment or an operating environment. This information may include a template image, a database image, or a reference image of a sign, a sign board, a billboard, a road sign, associated three-dimensional pose information, coordinates, etc. In one or more embodiments, the mapping component 192 may compute or extract one or more reference or 'raw' scale-invariant feature transform (SIFT) features from these template or reference images of the signs. In this way, SIFT features of template or reference images of the localization database 190 may be pre-computed or pre-calculated.

Further, the mapping component 192 may compute, calculate, or receive one or more positions, locations, or coordinate information associated with a sign board, billboard, or road sign. For example, the mapping component 192 may estimate a real world 3D position (e.g., sign board position or sign board locations) of one or more SIFT features or SIFT points of a billboard. In one or more embodiments, the mapping component 192 may estimate or determine one or more corner positions for a billboard or sign board in association with the real world 3D position using a global positioning system.

For example, the mapping component 192 may perform a rigid body transform between a frame and an inertial measurement unit (IMU) or sensor component capturing reference images of signs, sign boards, billboards, road signs to 3D points of the sign to obtain 3D coordinates with respect to the IMU or sensor component. In one or more embodiments, the mapping component 192 may determine 3D coordinates of a sign, a sign board, a billboard, a road sign with regard to a fixed Cartesian coordinate system or a world coordinate system (WCS) based on a 6 degrees of freedom (6 DoF) pose of the inertial measurement unit (IMU) or sensor component, which may be provided by a differential global positioning system (DGPS). In other words, the mapping component 192 may utilize DGPS or GPS as a source of ground truth for constructing a localization database 190 or the gathering data for the database component 194, such as one or more reference images and corresponding or associated location, position, or coordinate information.

In any event, the mapping component 192 may perform signboard mapping or build a 3D map including one or more signs or sign boards and corresponding 3D positions, true positions, real world positions, etc. The mapping component 192 may store corresponding data in the database component 194.

In one or more embodiments, the database component 194 may contain, store, or house one or more reference images of one or more signs, sign boards, billboards, or road signs and corresponding 3D positions, locations, or coordinate information for respective sign boards or billboards. For example, the database component 194 may store corner positions for one or more of the billboards. Positions or locations may be stored in a variety of formats, such as in a Cartesian coordinate system or a world coordinate system (WCS). In one or more embodiments, the database component 194 may be a part of the system 100 for sign based localization. In other embodiments, the database component 194 may be remotely accessed or accessible by the system 100 for sign based localization. For example, a third party, such as a surveying company may build a database of sign board images which may be accessed to facilitate localization. In other embodiments, the database component 194 may be included within or local to the system 100 for sign based localization. In other words, matching may be performed on-board of vehicle or performed off-board of vehicle or system 100 for sign based localization.

The communication component 130 may match an image or sign candidate captured by the sensor component 110 against one or more of the reference images of the database component 194 or localization database 190. Here, the communication component 130 may determine or search for a match (e.g., via data association) between one or more sign candidates or billboards captured by the sensor component 110 and reference images from a localization database 190 or database component 194 of corresponding billboard reference images.

Thus, images (e.g., or sign candidates derived therefrom) captured by the sensor component 110 may be cross-referenced against a database of template or reference images which includes position or location data associated with respective images. For example, text extracted from images captured by the sensor component 110 may be compared against text associated with images of the localization database 190 or database component 194. In one or more embodiments, the comparison may be performed using a feature based approach. Explained yet another way, the communication component 130 may check for a match using data association or feature matching. In other words, features, such as SIFT or MSER features of sign candidates may be compared against corresponding features of images of the localization database 190 or database component 194.

In one or more embodiments, the communication component 130 may implement putative scale-invariant feature transform (SIFT) matching to match sign candidate image sequences against reference images (e.g., matching an image or sign candidate portion of an image captured by the system 100 with an image from the localization database 190).

For example, the extraction component 120 may extract scale-invariant feature transform (SIFT) features from sign candidates of an image to find matches between the sign candidate and template or reference images of billboards from a localization database 190. Here, the communication component 130 may query the localization database 190 to find a match between SIFT features of a sign candidate and reference or raw SIFT features of template or reference images from the localization database 190 based on the largest number of putative SIFT matches, for example. In one or more embodiments, the communication component 130 determines matching based on a SIFT match threshold. Here, in this example, if a number of SIFT matches is greater than the SIFT match threshold (e.g., 10 features), the communication component 130 determines that the sign candidate is a match with the corresponding template or reference image. In this way, the matching provided by the communication component 130 results in very few false positive matches.

In one or more embodiments, the communication component 130 may apply one or more geometric constraints once one or more putative matches are found between sign candidates of an image or image sequences and template or reference images from a localization database 190. Further, the communication component 130 may perform additional filtering based on random sample consensus (RANSAC). In one or more embodiments, the communication component 130 may remove one or more outliers using homography based random sample consensus (RANSAC).

The localization component 150 may facilitate vehicle localization based on a match between a sign candidate and a reference image, coordinate information associated with the reference image, and a localization formula or algorithm. For example, the matching may be text matching (e.g., localization based on a match between text from a captured image and text from an image of localization database 190), feature matching (e.g., localization based on match between features from a captured image and features from an image of localization database 190), etc. In this way, the localization component 150 may determine a current location or current position of a vehicle.

In one or more embodiments, the localization component 150 may calculate estimated vehicle position (or sensor component 110 position, image capture component position, estimated camera position, vehicle pose, etc.) based on angle, distance, 3D positions of one or more SIFT features of a sign or billboard, etc. Here, the communication component 130 may obtain positional information associated with a matched billboard from the localization database 190, such as corner location information of a billboard. Using 3D-2D correspondences, the localization component 150 may calculate an estimated current location or current position for a vehicle.

In one or more embodiments, the localization component 150 may calculate the current position of the vehicle based on a perspective-n-point (PnP) algorithm. For example, an input to the localization component 150 may include a set of 3D-2D point correspondences, while an output of the localization component 150 may include a pose and coordinates of a vehicle in the real world environment or the operating environment. In other embodiments, the localization component 150 may implement a (PnP) solver module or a PnP unit or component to determine the current position of the vehicle with regard to a world coordinate system (WCS). Localization may be based on a plurality of views or images captured by the sensor component 110. The navigation component 160 may provide one or more navigation instructions based on the current position of the vehicle. In one or more embodiments, the system 100 for sign based localization may supplement a global positioning system (GPS) unit or utilize GPS as a starting location to facilitate quicker matching, for example. In other words, if it is known that a vehicle is in a given area, the scope of sign searching or matching (e.g., from localization database 190) may be adjusted accordingly.

Figure 2:
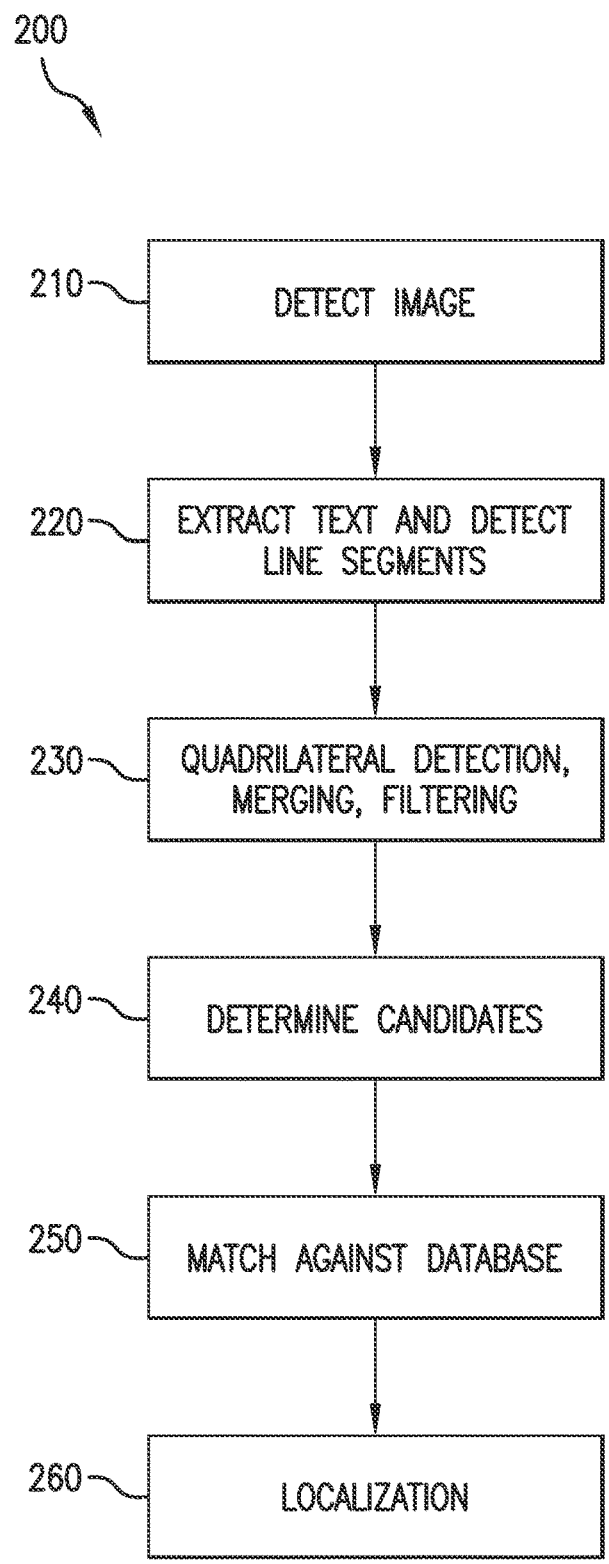
FIG. 2 is an illustration of an example flow diagram of a method for sign based localization, according to one or more embodiments.

FIG. 2 is an illustration of an example flow diagram of a method 200 for sign based localization, according to one or more embodiments. The method 200 may include detecting an image 210, extracting text and detecting line segments of the images at 220, detecting quadrilaterals, performing quadrilateral merging or quadrilateral filtering at 230, determining one or more sign candidates from one or more quadrilateral candidates at 240, matching sign candidates against reference images of a localization database at 250, and providing localization at 260.

Figure 3B:
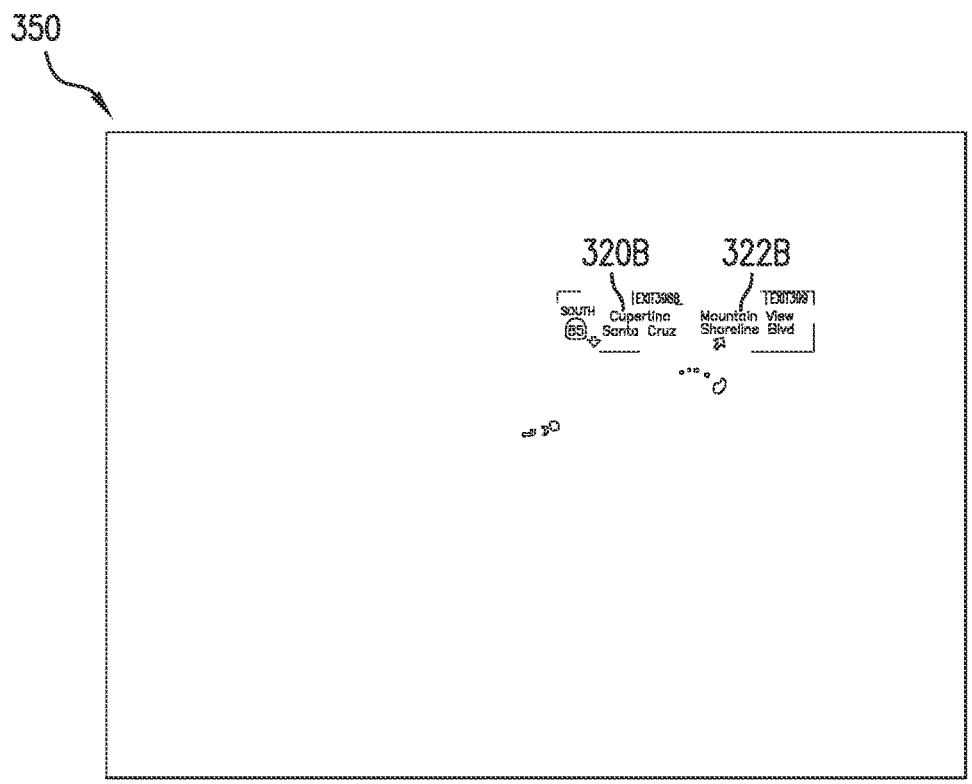

One or more of the following figures may be described with reference to one or more components of one or more other figures. For example, FIGS. 3-6 may be described with respect to one or more of the components of FIG. 1, according to a system 100 for sign based localization. FIGS. 3A-B are illustrations of example text extraction 350 from an image 300, according to one or more embodiments. In FIG. 3A, an image 300 may be captured, such as via a sensor component 110 of a system 100 for sign based localization. Here, the image may include one or more signs, such as sign 310A and 312A. Signs 310A and 312A may include text 320A and 322A, respectively. The extraction component 120 may identify or extract text 320A and 322A and the candidate component 140 may identify text 320A and 322A as text candidates. FIG. 3B is an illustration of an example graphical representation of the extracted text 350, which includes 320B and 322B (e.g., of signs 310A and 312A). As an example, the extraction component 120 may detect or extract text 320B and 322B based on a stroke width transform (SWT). In other embodiments, optical character recognition (OCR) may be utilized.

Figure 4A:
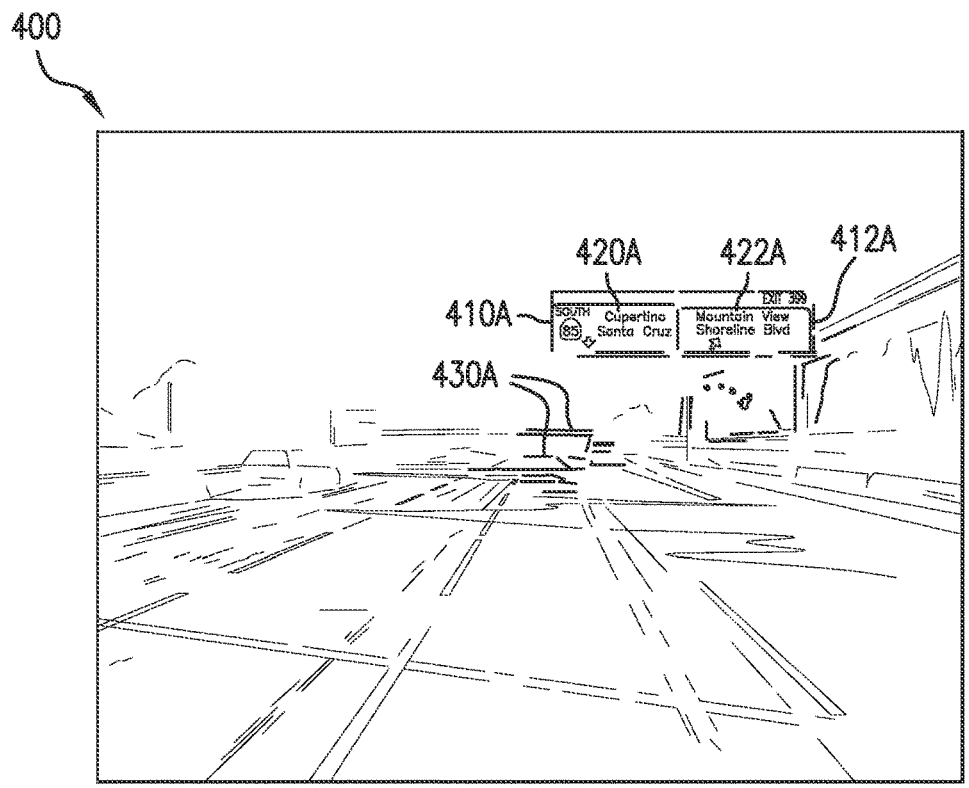
FIGS. 4A-B are illustrations of example quadrilateral detection from an image, according to one or more embodiments.
Figure 4B:
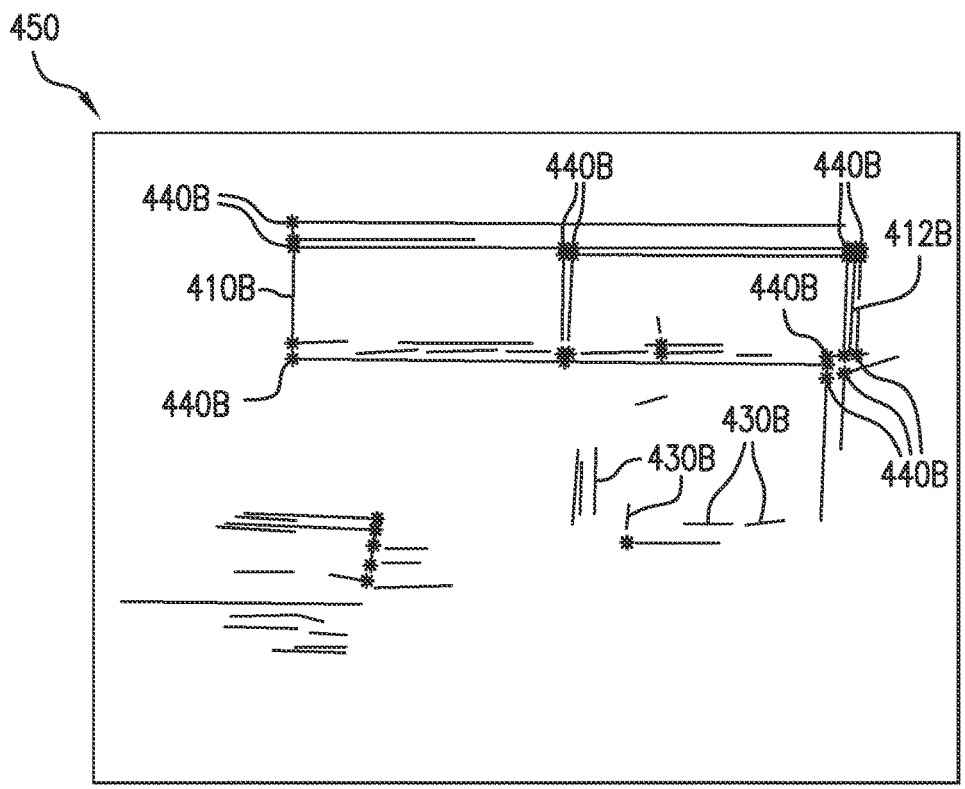

FIGS. 4A-B are illustrations of example quadrilateral detection 450 from an image 400, according to one or more embodiments. The extraction component 120 may detect line segments or perform line segment detection on the image 400. In FIG. 4A, an image 400 may be broken down or analyzed as a plurality of line segments, including line segments associated with a first sign 410A, line segments associated with a second sign 412A, other line segments 430A (not all line segments are numbered). The image 400 may also include text 420A and 422A associated with the first sign 410A and the second sign 412A, respectively.

FIG. 4B is an illustration of an image where line segment filtering may be performed by the candidate component 140 or the extraction component 120. Further, the extraction component 120 may detect one or more quadrilaterals within the image or perform quadrilateral detection 450. Here, in FIG. 4B, line segments 430B may be discarded by the candidate component 140 because no intersections are found. Line segments associated with signs 410B and 412B are found to have intersections 440B by the extraction component 120. The extraction component 120 may place a bounding box (not shown) around one or more of the line segments of sign 410B or 412B or one or more of the intersections associated therewith. In this way, the extraction component 120 may determine one or more quadrilateral candidates.

Figure 5A:
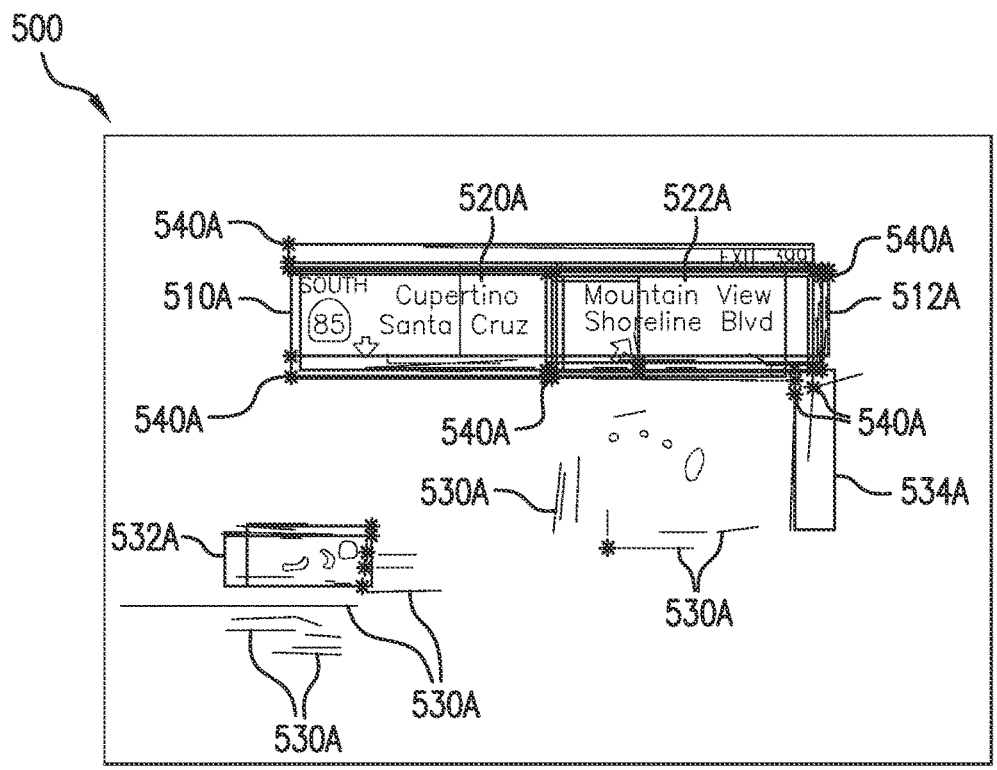
FIGS. 5A-B are illustrations of example quadrilateral filtering and merging from an image, according to one or more embodiments.
Figure 5B:
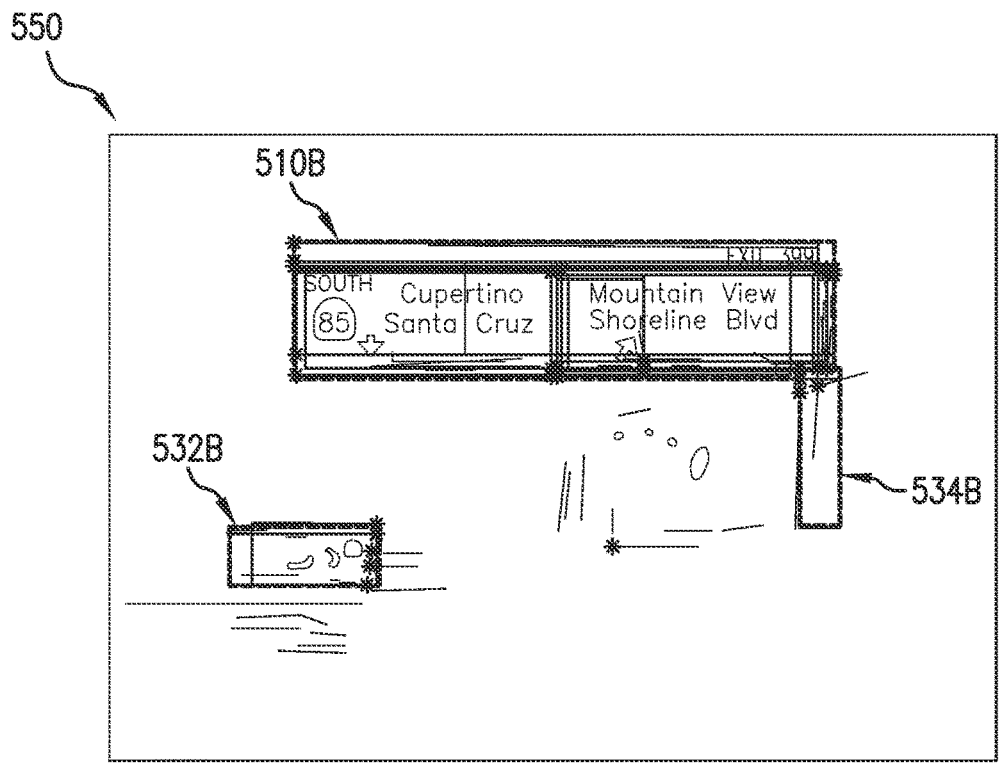

FIGS. 5A-B are illustrations of example quadrilateral filtering 500 and quadrilateral merging 550 from an image, according to one or more embodiments. In FIG. 5A, the candidate component 140 may filter one or more quadrilateral candidates among determined quadrilateral candidates 510A, 512A, 534A, and 532A. Quadrilateral candidates may be determined using corner detection to detect intersections 540A. Line segments at 530A which do not form a quadrilateral or have enough intersections may be discarded, and thus, not be considered as a quadrilateral candidate. The extraction component 120 may merge quadrilateral candidates 510A and 512A from FIG. 5A to become quadrilateral candidate 510B in FIG. 5B. In this way, quadrilateral candidates 510B, 532B, and 534B remain in FIG. 5B. The candidate component 140 or the extraction component 120 may perform further filtering or candidate selection by removing quadrilateral candidates which are not within a threshold proximity to text candidate distance of one or more text candidates. For example, because text 520A and 522A are associated with quadrilateral candidates 510A and 512A, and quadrilateral candidate 510B is merged or formed from quadrilateral candidates 510A and 512A, quadrilateral candidate 510B is associated with respective text 520A and 522A. In FIG. 5B, quadrilateral candidates 532B and 534B are not associated with or do not contain any text candidates. Thus, the candidate component 140 may filter or remove quadrilateral candidates 532B and 534B from consideration, thereby merely considering 510B as a quadrilateral candidate from the image of FIG. 5B.

Figure 6A:
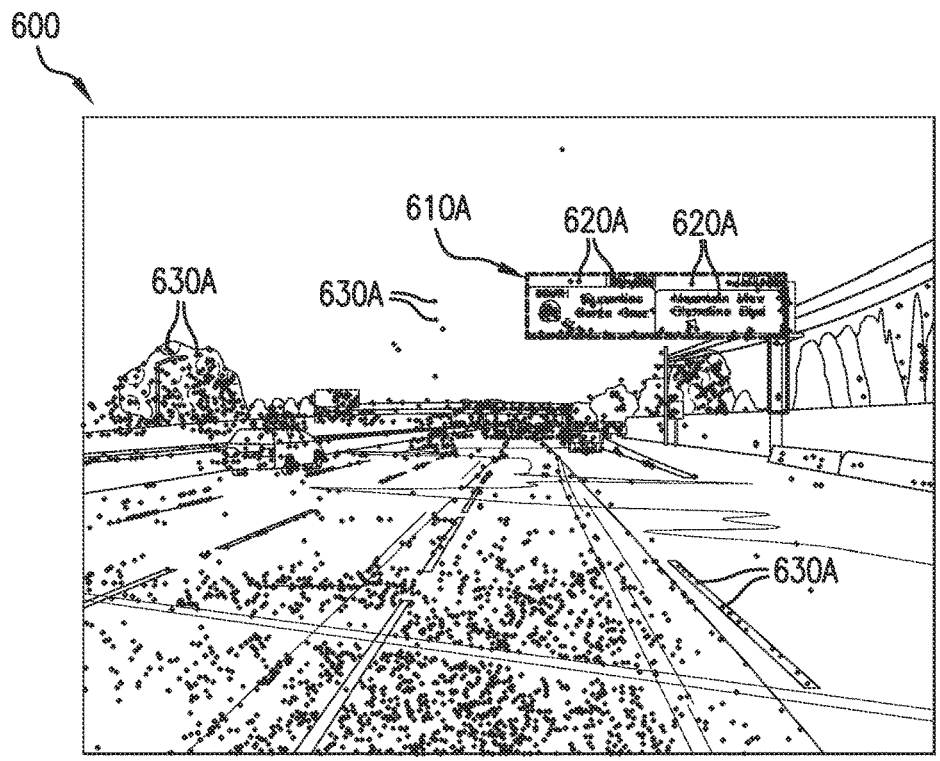
FIG. 6A is an illustration of example maximum stable extreme regions (MSER) features of an image, according to one or more embodiments.

FIG. 6A is an illustration of example maximum stable extreme regions (MSER) features of an image 600, according to one or more embodiments. Here, the merged quadrilateral candidate 610A may include text 620A which may be broken down or associated with maximum stable extreme regions (MSER) features. Other MSER features 630A may be present within the image 600. However, the extraction component 120 or the candidate component 140 may identify 610A as a sign candidate due to its proximity to text 620A. In this way, a sign candidate may be associated with text and one or more quadrilateral candidates.

Figure 6B:
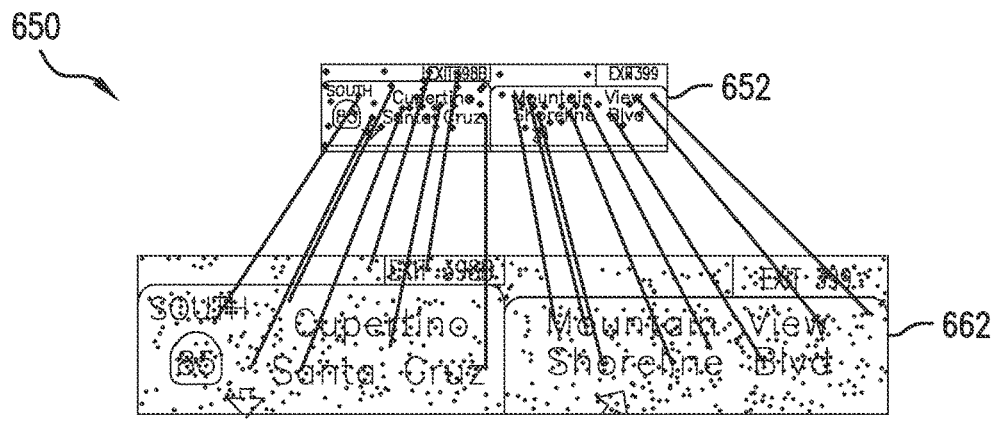
FIG. 6B is an illustration of example matching between a captured image and a reference image, according to one or more embodiments.

FIG. 6B is an illustration of example matching 650 between a captured image and a reference image, according to one or more embodiments. For example, a sign candidate or image 662 may have features (e.g., dots) matched to a reference image 652. In one or more embodiments, putative SIFT matching may be employed to facilitate such matching.

For example, FIG. 6B is a visual representation of matching which may be performed by a system 100 for sign based localization. At 662, an image captured by a system 100 for sign based localization is shown. At 652, a template image or a reference image from a localization database 190 is shown. Here, the communication component 130 may perform putative matching between image 662 and 652. For example, text or text features from respective images 662 and 652 may be compared using scale-invariant feature transform (SIFT) features extracted from respective images 662 and 652. Features of 652 may be determined or predetermined by the mapping component 192, while features of sign candidate image 662 may be extracted by the extraction component 120.

Figure 6C:
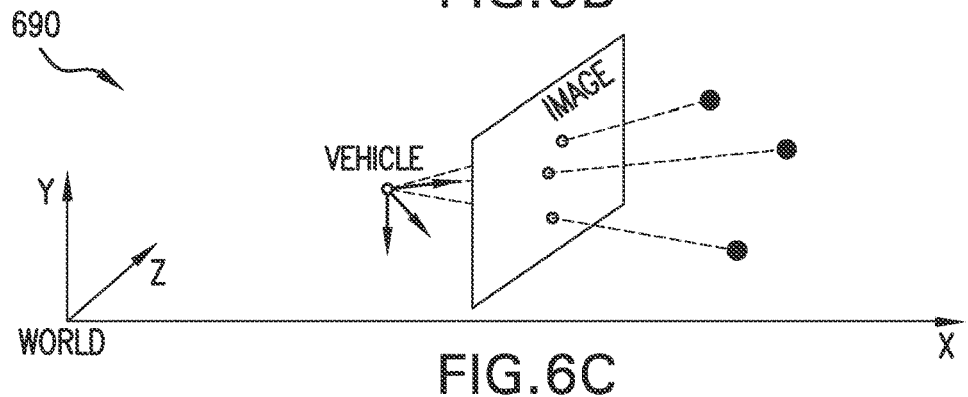
FIG. 6C is an illustration of an example localization based on a perspective-n-point (PnP) algorithm, according to one or more embodiments.

FIG. 6C is an illustration of an example localization 690 based on a perspective-n-point (PnP) algorithm, according to one or more embodiments. For example, the localization component 150 may calculate a current position, location, pose, or coordinates of a vehicle based on a perspective-n-point (PnP) algorithm based on a set of 3D-2D point correspondences. This may be implemented in a system as a (PnP) solver module or a PnP unit or component, for example.

Figure 7:
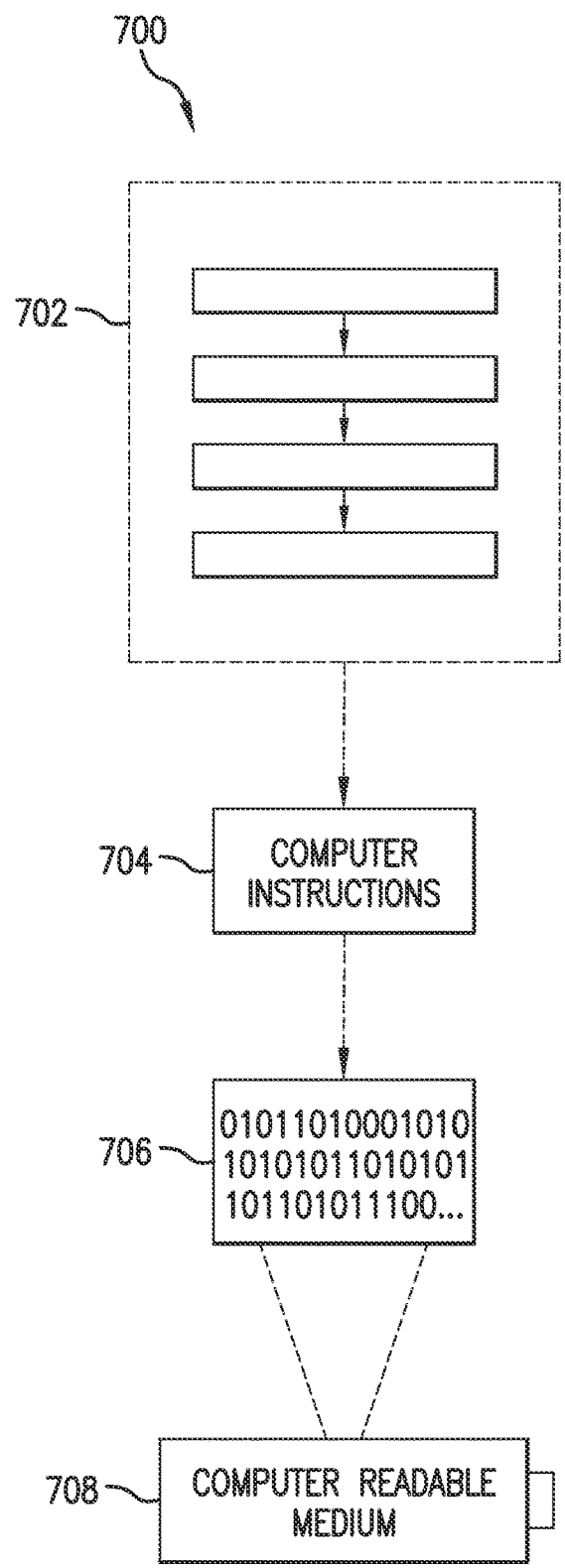
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method 702, such as the method 200 of FIG. 2. In another embodiment, the processor-executable instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
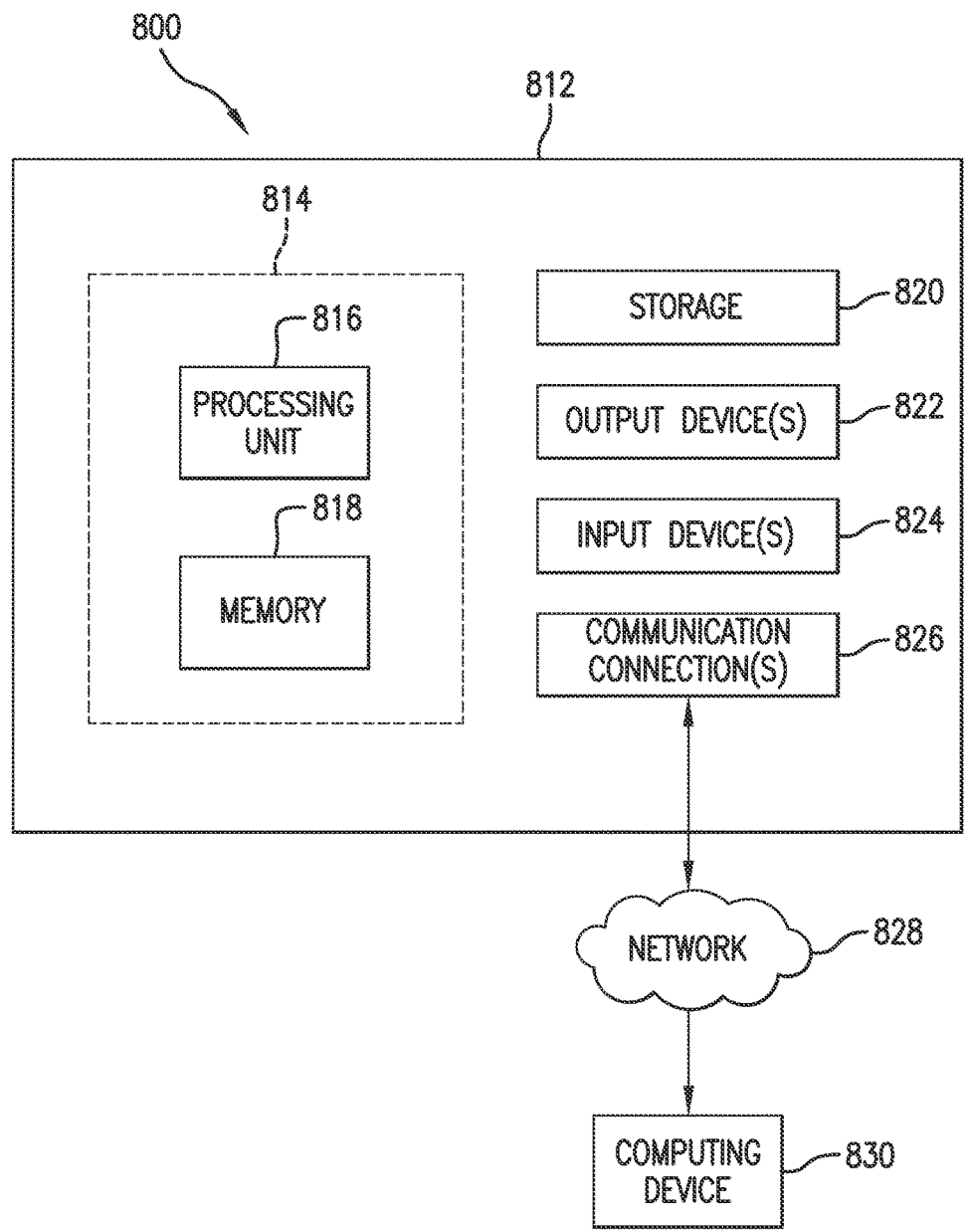
FIG. 8 is an illustration of an example computing environment where one or more of the provisions set forth herein are implemented, according to one or more embodiments.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in embodiments provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for sign based localization, comprising:
   a sensor component mounted to a vehicle, the sensor component capturing an image of an operating environment around the vehicle;
   an extraction component:
     extracting one or more text candidates from the image, wherein a text candidate of the one or more text candidates comprises a plurality of points;
     detecting one or more line segments within the image, wherein a line segment of the one or more line segments comprises a plurality of points;
     filtering one or more of the detected line segments based on proximity of two points of the plurality of points of the detected line segments to one point of the plurality of points of the extracted text candidates to select one or more filtered line segments having proximity of the two points being less than a threshold, wherein the proximity defines a distance from one point of the plurality of points of a text candidate to one point of the plurality of points of a detected line segment; and
     defining one or more quadrilateral candidates based on one or more of the extracted text candidates, one or more of the filtered line segments, and one or more intersections of respective line segments;
   a candidate component determining one or more sign candidates for the image based on one or more of the quadrilateral candidates and one or more of the extracted text candidates;
   a communication component communicating with a localization database and matching one or more of the sign candidates against one or more reference images stored in the localization database; and
   a localization component determining a location of the vehicle based on a match between one or more of the sign candidates and one or more of the reference images.

2. The system of claim 1, wherein the extraction component extracts one or more of the text candidates based on a stroke width transform (SWT).

3. The system of claim 1, wherein the candidate component filters one or more of the quadrilateral candidates based on a ground plane.

4. The system of claim 1, wherein the extraction component extracts one or more scale-invariant feature transform (SIFT) features from one or more of the sign candidates.

5. The system of claim 1, wherein the candidate component filters one or more of the sign candidates based on a number of scale-invariant feature transform (SIFT) features associated with respective sign candidates.

6. The system of claim 1, wherein the extraction component filters one or more of the line segments based on a line segment length criteria.

7. The system of claim 1, wherein the candidate component filters one or more line segments based on a vertical tolerance range or a horizontal tolerance range.

8. The system of claim 1, wherein the extraction component performs line segment linking based on two or more collinear line segments having endpoints which are less than the threshold proximity away from one another.

9. The system of claim 1, wherein the candidate component filters one or more of the quadrilateral candidates based on a text candidate area to quadrilateral area threshold ratio.

10. The system of claim 1, wherein the candidate component filters one or more of the sign candidates based on a number of maximum stable extreme regions (MSER) features associated with respective sign candidates.

11. The system of claim 1, wherein the communication component matches one or more of the sign candidates against one or more of the reference images based on putative scale-invariant feature transform (SIFT) matching.

12. The system of claim 1, wherein the communication component removes one or more outliers from the matching based on homography based random sample consensus (RANSAC).

13. The system of claim 1, wherein the localization component determines the location of the vehicle using a perspective-n-point (PnP) solver module.

14. The system of claim 1, comprising a navigation component generating one or more navigation instructions based on the location of the vehicle.

15. A method for sign based localization, comprising:
   capturing an image of an operating environment around a vehicle by a sensor component mounted to a vehicle;
   extracting one or more text candidates from the image, wherein a text candidate of the one or more text candidates comprises a plurality of points;
   detecting one or more line segments within the image, wherein a line segment of the one or more line segments comprises a plurality of points;
   filtering one or more of the detected line segments based on proximity of two points of the plurality of points of the detected line segments to one point of the plurality of points of the extracted text candidates to select one or more filtered line segments having proximity of the two points being less than a threshold, wherein the proximity defines a distance from one point of the plurality of points of a text candidate to one point of the plurality of points of a detected line segment;
   defining one or more quadrilateral candidates within the image based on one or more of the extracted text candidates, one or more of the filtered line segments, and one or more intersections of respective line segments;
   filtering one or more of the quadrilateral candidates based on a ratio of an area associated with the text candidate to an area of the quadrilateral candidates existing in the captured image;
   determining one or more sign candidates for the image based on one or more of the quadrilateral candidates and one or more of the extracted text candidates;

communicating with a localization database and matching one or more of the sign candidates against one or more reference images stored in the localization database; and determining a location of the vehicle based on a match between one or more of the sign candidates and one or more of the reference images.

16. The method of claim 15, comprising extracting one or more of the text candidates based on a stroke width transform.

17. The method of claim 15, comprising:

extracting one or more scale-invariant feature transform (SIFT) features from one or more of the sign candidates; and filtering one or more of the sign candidates based on a number of SIFT features associated with respective sign candidates.

18. The method of claim 15, comprising filtering one or more of the line segments based on a line segment length criteria.

19. The method of claim 15, comprising filtering one or more of the sign candidates based on a number of maximum stable extreme regions (MSER) features associated with respective sign candidates.

20. A system for sign based localization, comprising:

a sensor component mounted to a vehicle, the sensor component capturing an image of an operating environment around the vehicle;

an extraction component:

extracting one or more text candidates from the image, wherein a text candidate of the one or more text candidates comprises a plurality of points;

detecting one or more line segments within the image, wherein a line segment of the one or more line segments comprises a plurality of points;

filtering one or more of the detected line segments based on proximity of two points of the plurality of points of the detected line segments to one point of the plurality of points of the extracted text candidates to select one or more filtered line segments having proximity of the two points being less than a threshold wherein the proximity defines a distance from one point of the plurality of points of a text candidate to one point of the plurality of points of a detected line segment; and defining one or more quadrilateral candidates based on one or more of the extracted text candidates, one or more of the filtered line segments, and one or more intersections of respective line segments;

a candidate component determining one or more sign candidates for the image based on one or more of the quadrilateral candidates and on one or more of the extracted text candidates;

a communication component communicating with a localization database and matching one or more of the sign candidates against one or more reference images stored in the localization database based on putative scale-invariant feature transform (SIFT) matching; and a localization component determining a location of the vehicle based on a match between one or more of the sign candidates and one or more of the reference images, wherein the candidate component removes one or more of the quadrilateral candidates if the one or more of the quadrilateral candidates contain none of the extracted text candidates.

\* \* \* \* \*